United States Patent
Prasad et al.

(10) Patent No.: US 12,248,640 B2
(45) Date of Patent: Mar. 11, 2025

(54) ARTIFICIAL INTELLIGENCE BASED HYBRID SYSTEM AND METHOD FOR GENERATION OF WORD PREDICTIONS BASED ON LANGUAGE MODELLING

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN); Sumegha Yadav, Gurugram (IN)

(73) Assignee: TALENT UNLIMITED ONLINE SERVICES PRIVATE LIMITED (IN)

( * ) Notice: Subject to any disclaimer, the term of this patent is extended or adjusted under 35 U.S.C. 154(b) by 208 days.

(21) Appl. No.: 17/851,695

(22) Filed: Jun. 28, 2022

(65) Prior Publication Data
US 2023/0288990 A1   Sep. 14, 2023

(30) Foreign Application Priority Data

Mar. 8, 2022   (IN) .............................. 202211012599

(51) Int. Cl.
*G06F 3/023*    (2006.01)
*G06F 40/274*   (2020.01)
*G06F 40/30*    (2020.01)

(52) U.S. Cl.
CPC .......... *G06F 3/0237* (2013.01); *G06F 3/0236* (2013.01); *G06F 40/274* (2020.01); *G06F 40/30* (2020.01)

(58) Field of Classification Search
None
See application file for complete search history.

(56) References Cited

U.S. PATENT DOCUMENTS

2018/0013699 A1 * 1/2018 Sapoznik ................ G10L 15/26
2022/0124056 A1 * 4/2022 Cress .................... G06F 40/284

* cited by examiner

*Primary Examiner* — Antim G Shah
(74) *Attorney, Agent, or Firm* — Joy S Goudie (57) ABSTRACT

The present invention provides systems and methods for dynamic word prediction and suggestion. The method includes an AI engine configured to render a touch-enabled keyboard interface on a display unit of the electronic device, identify a plurality of elements of an input message of a user on a messaging application and transform the input message into an array of a specific numbers based on the plurality of elements. The method further includes converting the array into a 2D matrix of embeddings by the AI engine, wherein the embeddings include semantic information of the input message to identify a context of the input message and converting the matrix into an output array with a changed dimension. The AI engine is further configured to convert the output array into probabilities of one or more words corresponding to the input message of the user on the messaging application.

14 Claims, 7 Drawing Sheets

«ARTIFICIAL INTELLIGENCE BASED HYBRID SYSTEM AND METHOD FOR GENERATION OF WORD PREDICTIONS BASED ON LANGUAGE MODELLING»

BACKGROUND

Technical Field

The present invention, in general, is related to a system and method for text input on portable communication device. The present invention is particularly related to a system and a method for generating word predictions. The present invention is more particularly related to an artificial intelligence-based system and a method for generating character and word predictions and recommendations based on language modellings and hybrid approach.

Description of the Related Art

In recent times, word suggestion is a quite common feature during typing in any text platform using keyboards. As a user types text on the keyboard, the user sees predictions for the next word, which includes predictions of words, characters, and emoji that could take the place next to the typed word, and other suggestions based on the recent activity and information from the user applications. Almost all the keyboards supporting any texting platforms include this feature. The user further has the freedom to accept or reject the suggested words. To accept the suggestions of words, the user will have to tap or select from the list of suggestions or accept a highlighted suggestion by entering a space or punctuation.

Most of the keyboards in the present times use probabilistic approaches for the word suggestion. Semantic networks produced from input data have statistical properties that cannot be easily captured by spatial representations. Hence, according to the probabilistic approach, the semantic representation that explicitly models the probability with which words will occur in different contexts, and hence captures the probabilistic relationships between words. The representation has statistical properties consistent with the large-scale structure of semantic networks constructed by humans and trace the origins of these properties. However, probabilistic approaches for the word suggestion are prone to high latency and requires higher memory usage, which make them incompetent for the usage in smart phones and tablets.

The other approaches to generate word suggestions include usage of artificial neural networks, especially Recurring Neural Network. The neural network is used to develop two types of models which are Character-based models and Word-based models. Both the model architectures have their own pros and cons. While the Word-based models take input word by word and their inference time is optimized, whereas the Character-based language models take input character by character and thus the inference time is a little higher, but the character models can understand the word morphology better than the Word-based models. Further, the Character-based language models have a small vocabulary, which mean, in practice the character models will require less memory and have faster inference than their word counterparts.

However, none of the existing methods provide a hybrid approach that incorporates the advantages of both the Character based models and Word-based models. Hence, there is a long-felt need for an artificial intelligence-based system and method for dynamically predicting and suggesting words on a quick access interface that has higher accuracy, lower computational cost, less memory requirement, and have faster inference component in real time.

The above-mentioned shortcomings, disadvantages and problems are addressed herein, and which will be understood by reading and studying the following specification.

OBJECTIVES OF THE EMBODIMENTS

The primary objective of the embodiment herein is to develop an artificial intelligence-based system and method for dynamically predicting and suggesting words, on a quick access word interface, and herein exemplarily referred to as a "quick access interface", in real time.

Another object of the embodiment herein is to dynamically predict and generate word suggestions based on a plurality of factors, comprising an input message entered by a user in an input field provided by a user application, context of the input message, a location of the input message, one or more languages of the input message, intent of the input message, user preferences, global preferences, etc., in real time using artificial intelligence (AI).

Yet another object of the embodiment herein is to provide a quick access interface for displaying predictions and suggestions of words in a conveniently accessible and switchable location on an input interface.

Yet another object of the embodiment herein is to provide a hybrid AI architecture that understands the nuances of any language at a character level to execute at least one of a word prediction, word completion, word suggestion and a complete sequence completion.

These and other objects and advantages embodiment herein will become readily apparent from the following detailed description taken in conjunction with the accompanying drawings.

SUMMARY

This summary is provided to introduce a selection of concepts in a simplified form that are further disclosed in the detailed description. This summary is not intended to determine the scope of the claimed subject matter.

The embodiments herein provide a system and method for dynamic word prediction and suggestion. According to an embodiment of the present invention, the method includes an AI engine which is configured to render a touch-enabled keyboard interface on a display unit of the electronic device, to identify a plurality of elements of an input message of a user on a messaging application and to transform the input message into an array of a specific numbers based on the plurality of elements. The method further includes conversion of the array into a two-dimensional matrix of embeddings by the AI engine, and wherein the embeddings that correspond to the dimensions, include semantic information of the input message to identify a context of the input message, and conversion of the two-dimensional matrix into an output array with a changed dimension. Also, the AI engine is further configured to convert the output array into probabilities of one or more words corresponding to the input message of the user on the messaging application.

The embodiments herein discloses a system and a method for dynamic word prediction and suggestion, and wherein the plurality of elements is at least any one of a character element, a grammatical element, a numeric element, an image element, a line break element, a space element, and a pattern. The system is further configured to sanitize the input message, prior to the transformation of the input message, into the array of the specific numbers based on the plurality of elements, and wherein the sanitization of the input message includes at least one of conversion of the input message to all lowercase characters and removal of spaces and punctuations. According to an embodiment of the present invention, the sanitization of the input message includes removal of at least one of special characters, all characters other than a-z, A-Z, and 0-9, line breaks, variation selectors, control characters, repeated punctuations, repeated characters. The system is further configured to at least append or truncate the characters of the input message to transform the input message into the array of the specific number.

According to one embodiment herein, the quick access interface is positioned proximal to the input field in a switchable location on an input interface, such as, a touch-enabled keyboard interface, of an electronic device. The quick access interface displays predictions and suggestions in a conveniently accessible and switchable location on the input interface. According to an embodiment of the present invention, the AI engine renders preconfigured grouped sets of words on the quick access interface, when the input message is not detected in the input field of the user application.

According to one embodiment herein, the related systems comprise circuitry and/or programming instructions for executing the method disclosed in the present invention. According to an embodiment of the present invention, the circuitry and/or programming instructions are any one of a combination of hardware, software, and/or firmware configured to implement the present invention depending upon the design choices of a system designer. According to an embodiment of the present invention, various structural elements are employed depending on the design choices of the system designer.

These and other of the embodiments herein will he better appreciated and understood, when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof and the embodiments herein include all such modifications, It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The detailed description of various exemplary embodiments of the disclosure is described herein with reference to the accompanying drawings. It should be noted that the embodiments are described herein in such details as to clearly communicate the disclosure. However, the details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood however, it is not intended to limit the disclosure to the forms disclosed, but on the contrary, the disclosure is to cover all modifications, equivalents, and alternatives falling within the scope of the disclosure.

The embodiments herein discloses an artificial intelligence-based system and method for dynamically predicting and suggesting one or more words on a quick access interface, herein exemplarily referred to as a "quick access interface", in real time. Moreover, the present invention employs an artificial intelligence (AI) engine configured to execute one or more AI algorithms for dynamically predicting and generating one or more words suggestions based on a plurality of factors, for example, an input message entered by a user in an input field provided by a user application and context of the input message in real time.

The AI engine detects an input message in an input field provided on a graphical user interface (GUI) of a user application. The AI engine processes the input message to identify a plurality of elements of the input message. In one embodiment, the elements of the input message comprise, character elements, grammatical elements, numeric elements, image elements, line break elements, space elements, patterns, etc. The AI engine analyses and determines a context of the input message. The factors associated with the input message comprise, a location of the input message, one or more languages of the input message, intent of the input message, user preferences, global preferences, etc. The languages comprise individual languages and a mixture of any two or more of the individual languages, also referred to as "macaronic languages". The AI engine dynamically generates one or more word suggestions based on the determined context and one or more of the factors in real time.

The AI engine is configured to generate text, text summarization and the like. Once the AI engine understands the nuances of a language, the AI engine may be further used in applications involving textual handling such as Intent Analysis, Sentiment Analysis, Chatbots, Generating Articles, Generating new sentences, paragraphs, or documents, Generating suggested continuation of a sentence, Transcribing a speech, Creating text captions for a movie or TV show, issuing commands to the radio while driving. Since the present invention includes benefits of both the Character based and Word-based models in one, the AI engine incorporates the character based morphological features of any language while maintaining the low computational cost and higher accuracy of Word-based model architectures. Accordingly, if a spelling mistake occurs or if a word is completely out of the final vocabulary of the AI model, the AI engine learns granular information and understands the contextual information to predict one or more word for a given input text.

According to one embodiment herein, the quick access interface is positioned proximal to the input field in a switchable location on an input interface, such as, a touch-enabled keyboard interface, of an electronic device. The quick access interface displays predictions and suggestions of one or more words in a conveniently accessible and switchable location on the input interface. According to an embodiment, the AI engine renders preconfigured grouped sets of words on the quick access interface, when the input message is not detected in the input field of the user application.

According to one embodiment herein, an Artificial Intelligence (AI) based hybrid system is provided for dynamic word prediction and suggestion, The system comprises an electronic device comprising an input device, at least one processor, a memory unit operably and communicatively coupled to the at least one processor, and a display unit; a sensor unit comprising one or more of a plurality of sensors and operably coupled to the at least one processor of the electronic device; and an AI engine operably coupled to the sensing unit, the at least one processor, and a messaging application deployed on the electronic device, wherein the engine is configured to identify a plurality of elements of an input message of an input language on the messaging application; replace each of the plurality of elements of the input message with a corresponding integer present in vocabulary of the input language to transform the input message into an array of a specific number based on the plurality of elements; convert the array into a two-dimensional matrix of embeddings, wherein the embeddings include semantic information of the input message to identify a context of the input message; convert the two-dimensional matrix into an output array with a changed dimension; and convert the output array into probabilities of one or more words corresponding to the input message of the user on the messaging application.

According to one embodiment herein, the plurality of elements is at least one of a character element, a grammatical element, a numeric element, an image element, a line break element, a space element, and a pattern.

According to one embodiment herein, the AI engine is further configured to sanitize the input message prior to the transformation of the input message into the array of the specific numbers based on the plurality of elements, and wherein the sanitization of the input message includes at least one of conversion of the input message to all lowercase characters and removal of spaces and punctuations, and wherein the sanitization of the input message includes removal of at least one of special characters, all characters other than a-z, A-Z, and 0-9, line breaks, variation selectors, control characters, repeated punctuations, repeated characters, According to one embodiment herein, the AI engine is further configured to at least append or truncate characters of the input message to transform the input message into the array of the specific number.

According to one embodiment herein, wherein the embeddings corresponding to the two-dimensional matrix represents number of dimensions.

According to one embodiment herein, the AI engine is further configured to generate a feature map based on the conversion of the two-dimensional matrix into the output array.

According to one embodiment herein, the input language comprises at least one of individual languages and a mixture of two or more of the individual languages.

According to one embodiment herein, a hybrid method for dynamic word prediction and suggestion using an artificial intelligence engine is provided. The method comprising steps of rendering, by an input device of an electronic device, a touch-enabled keyboard interface on a display unit of the electronic device; identifying, by an artificial intelligence (AI) engine, a plurality of elements of an input message of an input language on the messaging application; replacing each of the plurality of elements of the input message with a corresponding integer present in vocabulary of the input language to transform the input message into an array of a specific number based on the plurality of elements; converting, by the an AI engine, the array into a two-dimensional matrix of embeddings, wherein the embeddings include semantic information of the input message to identify a context of the input message; converting, by the an AI engine, the two-dimensional matrix into an output array with a changed dimension; and converting, by the an AI engine, the output array into probabilities of one or more words corresponding to the input message of the user on the messaging application.

According to one embodiment herein, the plurality of elements is at least one of a character element, a grammatical element, a numeric element, an image element, a line break element, a space element, and a pattern.

According to one embodiment herein, the method further comprises sanitizing the input message prior to the transformation of the input message into the array of the specific numbers based on the plurality of elements, and wherein the sanitization of the input message includes at least one of conversion of the input message to all lowercase characters and removal of spaces and punctuations, and wherein the sanitization of the input message further includes removal of at least one of special characters, all characters other than a-z, A-Z, and 0-9, line breaks, variation selectors, control characters, repeated punctuations, repeated characters, According to one embodiment herein, the method further comprises at least appending or truncating characters of the input message to transform the input message into the array of the specific number.

According to one embodiment herein, the embeddings corresponding to the two-dimensional matrix represents number of dimensions.

According to one embodiment herein, the method further comprises generating of a feature map based on the conversion of the two-dimensional matrix into the output array.

According to one embodiment herein, wherein the input language comprises at least one of individual languages and a mixture of two or more of the individual languages.

Figure 3:
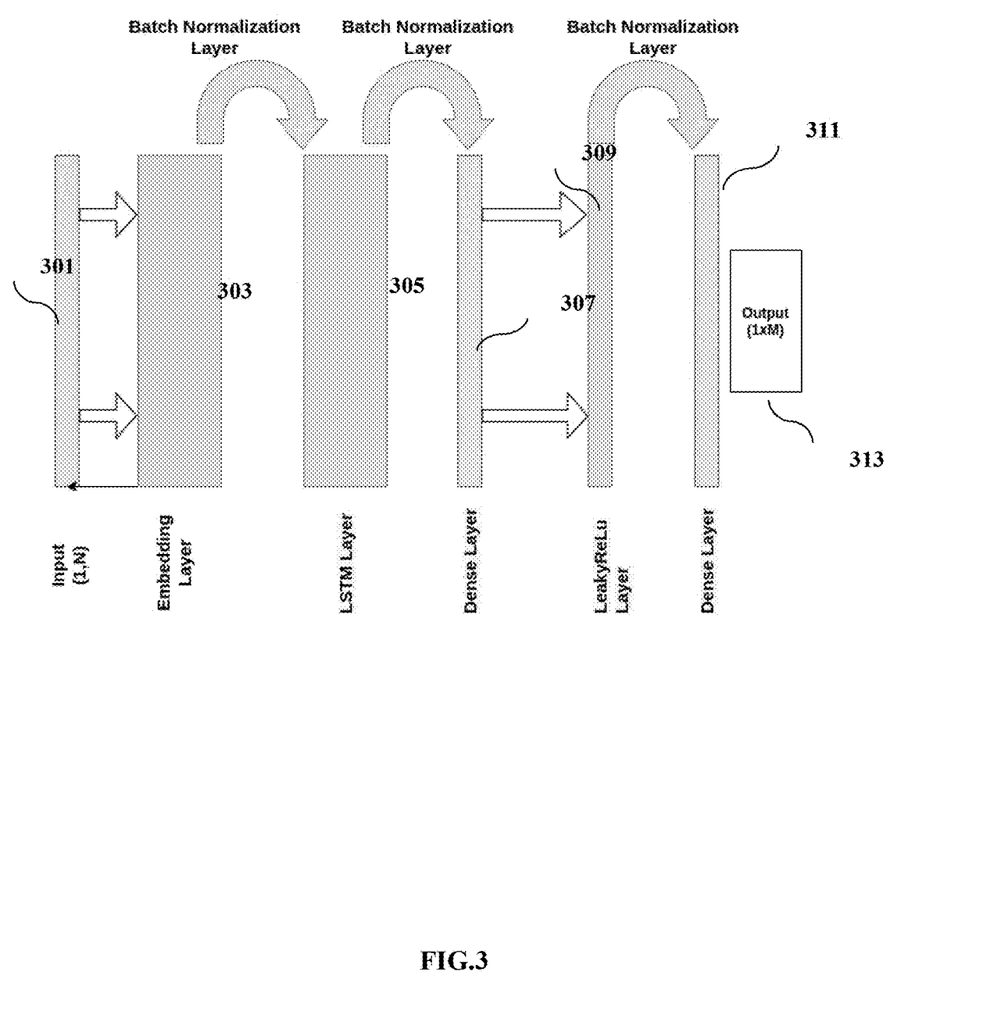
FIG. 3 illustrates a functional block diagram of an artificial intelligence-based language model for dynamically generating one or more-word suggestions based on the context of the received text on a graphical user interface provided by a system, according to one embodiment herein.

According to one embodiment herein, the block diagram of model architecture comprises several layers which are explained below.

Input Layer: This is the very first layer of the model, it takes a one-dimensional array of integers as an input and passes this input to the embedding layer.

Embedding Layer: This layer converts one dimensional array into 2-D matrix of embeddings. Embeddings contain the semantic information of the tokens.

Batch Normalization: This layer is used to normalize the intermediated feature map. Batch Normalization makes training faster.

LSTM: Long Short-Term Memory (LSTM) is used to process the sequential information present in the feature map. LSTM is a special kind of RNN that has a memory cell associated with it. It allows us to train using longer sequences by reducing the chances of vanishing gradient problems.

Dense Layer: This is a Linear fully connected layer, which receives the input from LSTM and passes the output to the next layer (output layer).

LeakyReLU: It is an activation function; it is the improved version of ReLU activation function. We are using LeakyReLU as an activation function applied on output of the dense layer.

Output Layer: This layer outputs a one-dimensional array representing the probability of words. We have used the softmax activation function to calculate the probabilities.

According to one embodiment herein, the method for training the language model for Word completion, Word prediction, and Autocorrection processes or a corresponding intent from a system/machine's perspective is as follows. The method comprises the steps of Data Collection, Cleaning the collected data, processing the data, tuning parameters of model and finalizing a model data architecture, creating training, testing and validation data sets from the data, training the model and checking the metrics on the test data set, tuning the hyper parameters to improve the score and then retrain the model, and finalizing the final data model.

According to one embodiment herein, the step-by-step procedure is explained as follows.

Data Collection: Data is collected through ACD text gathered from the bobble network of keyboards.

Cleaning: the unnecessary information such as emojis, symbols, numbers, and special characters are removed from the collected data.

Processing the data: The sentences are transformed in such a way that the model is able to understand the suggestive and predictive approach with proximity typos. For example, For suggestions: the exemplary sentence=How are you and the Transformation=how ar--->are, how are y--->you For prediction: the transformation=how<space>---->are, how are <space>-->you Introducing typos involves adding one and two edit letters based on proximity in QWERTY keypad to words with length more than 2.

Transformation=how afe--->are,thimkinh-->thinking

Parameters and architecture: Different parameters like learning rate, epochs, optimizers, units, and batch size are selected.

According to one embodiment herein, the method of processing an input array using a hybrid model comprises the following steps. Whenever an input text is received, the input text is converted into an array of numbers of size (1, 25) with the help of vocabulary and is fed into the Input layer of the model. The Input layer passes this array to the embedding layer, which converts this one-dimensional array to a 2-D matrix of embeddings. According to an embodiment herein, a preset embedding dimension of 16 is used so that the dimension of the matrix which is received from the embedding layer is (25, 16). After receiving the matrix from the embedding layer, this matrix is passed from the Batch Normalization layer, which converts the matrix into normal distribution. This batch normalization layer does not change the shape of the feature map. After passing through the batch normalization layer, the feature map is passed to the LSTM layer where sequential data is processed. According to an embodiment herein a preset number of units such as 512 units is used in the LSTM layer, so that a one-dimensional array of shape (1, 512) is received as the output of LSTM layers. One dimensional array which received as output from LSTM layer is passed to Batch Normalization layer, and wherein Batch Normalization layer converts the matrix into normal distribution works same as explained above, and then this array is passed to dense layer (fully connected layer), for changing the dimension of this array from (1, 512) to (1, 100). A LeakyReLU is used as an activation function which modifies the array but does not change the dimension of array. At last, (at the end), the one-dimensional array of shape (1, 100) is passed to the output layer which is also a dense layer. This dense layer uses softmax activation function to convert the output array into probabilities. According to an embodiment herein, a vocabulary of 17739 words is used for receiving an array of probability of the same shape.

According to one embodiment herein, the method of selecting the most probable words from an array to show a suggestion strip on the user interface, is as follows. Any received input text is converted it to a one-dimensional array of shape (1, 25) after preprocessing and this one-dimensional array is passed to the hybrid language model. The Model is configured to output an array of probabilities of shape (1, V) where V is the size of the vocabulary. According to an embodiment of the present invention, the top n most probable words from this array of probabilities are selected and shown on the suggestion strip of the user interface.

The basic architecture of the embodiments herein comprises an input layer of characters and output layer of words. The system is configured to handle macaronic language like Hi-En. When Hindi words are written using Latin characters, with a mix use of En words in between, the same is also handled. The algorithm for handling such code-mixed languages is also done using AI (Fast text) so that model understands the switch between a proper En word and a Hi-En word.

The system of the present invention is used in a multitude of ways, which include any kind of text generation, summarization etc. Once the capability of understanding the nuances of a language is done, models are used in applications involving any kind of textual handling like Intent Analysis, Sentiment Analysis, Chatbots, Generating new article headlines, generating new sentences, paragraphs, or documents, generating suggested continuation of a sentence, transcribing a speech, creating text captions for a movie or TV show, issuing commands to the radio while driving.

Figure 1:
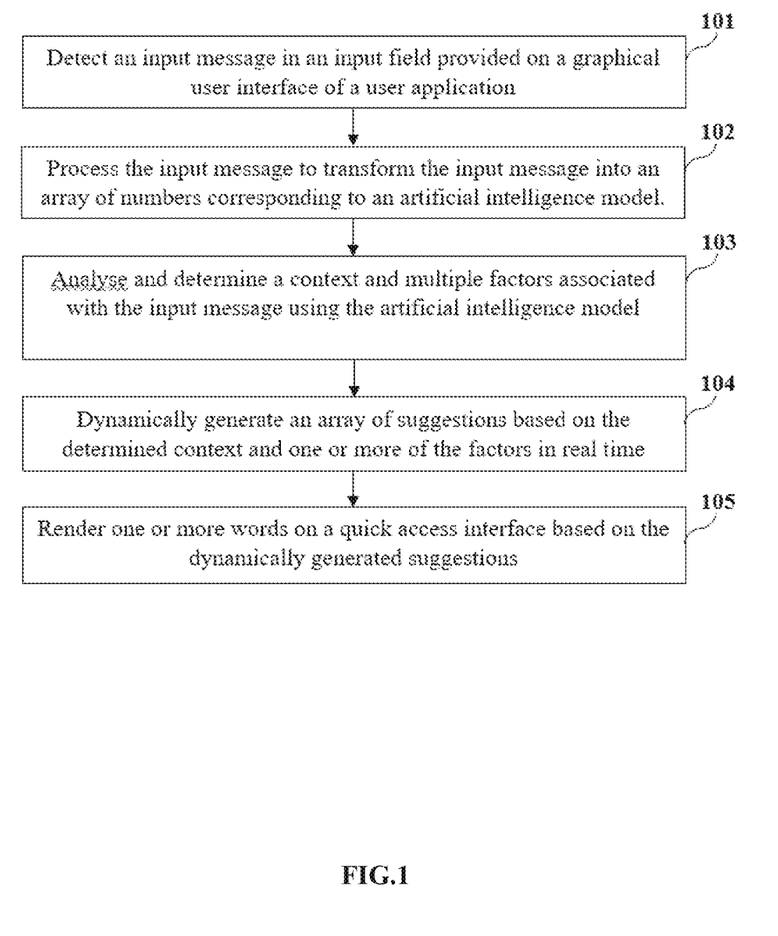
FIG. 1 illustrates a flowchart of an artificial intelligence-based method for dynamically predicting and suggesting one or more words on a quick access interface in real time, according to an embodiment of the present invention, according to one embodiment herein.

FIG. 1 illustrates a flowchart of an artificial intelligence-based method for dynamically predicting and suggesting one or more words on a quick access interface in real time, according to one embodiment herein. For purposes of illustration, the detailed description refers to one or more word suggestions rendered on a quick access interface; however, the scope of the method and the system disclosed herein is not limited to dynamically predicting and suggesting words on the quick access interface but may be extended to dynamically predicting and suggesting set of words, characters, words of any language on a quick access interface.

The method disclosed herein employs an artificial intelligence (AI) engine configured to execute one or more AI algorithms for dynamically predicting and suggesting one or more words on a quick access interface in real time. The AI engine includes a model which is trained based on a collection of data. In one embodiment, the collection of data includes chat data comprising Latin characters. The chat data of Latin characters includes at least one sentence of input message. In one example, the sentence includes at least five words. The method of training the AI model is described in FIG. 4

The AI engine detects 101 an input message in an input field provided on a graphical user interface (GUI) of a user application. The user application is, for example, a messaging application, a business communication application, an electronic commerce (e-commerce) application, an electronic mail (email) application, a gaining application, a media application, etc., deployed on an electronic device. In an embodiment, the user application is operably coupled to the AI engine. The AI engine processes 102 the input message to transform the input message into an array of numbers corresponding to an artificial intelligence model. For preparing the array of number, the input message is sanitized, wherein the sanitization includes removal of all special characters from the message and removal of characters outside a-z, A-Z, and 0-9. Further, the sanitization includes removal of line breaks, variation selectors, and control characters. The AI engine is further configured to collapse multiple allowed punctuations to single occurrence. For example, the marks '!!!!' is collapsed to '!'. Also, the AI engine is configured to collapse multiple character occurrences, find a repeating pattern and replace it with a single pattern appearance, masking presence of numbers in the message, and collapsing multiple spaces to single space based on stripping leading and trailing spaces.

According to one embodiment herein, the input message comprises, for example, character elements, grammatical elements, numeric elements, image elements, line break elements, space elements, patterns, etc. The AI engine analyses and determines 103 a context and multiple factors associated with the input message for each of the identified elements of the input message using an AI model. The factors associated with the input message comprise, for example, a location of the input message, one or more languages of the input message, intent of the input message, user preferences, global preferences, etc. The languages comprise, for example, individual languages and a mixture of any two or more of the individual languages, also referred to as "macaronic languages". The AI engine dynamically generates 104 an array of word suggestions based on the determined context and one or more of the factors in real time.

Figure 2A:
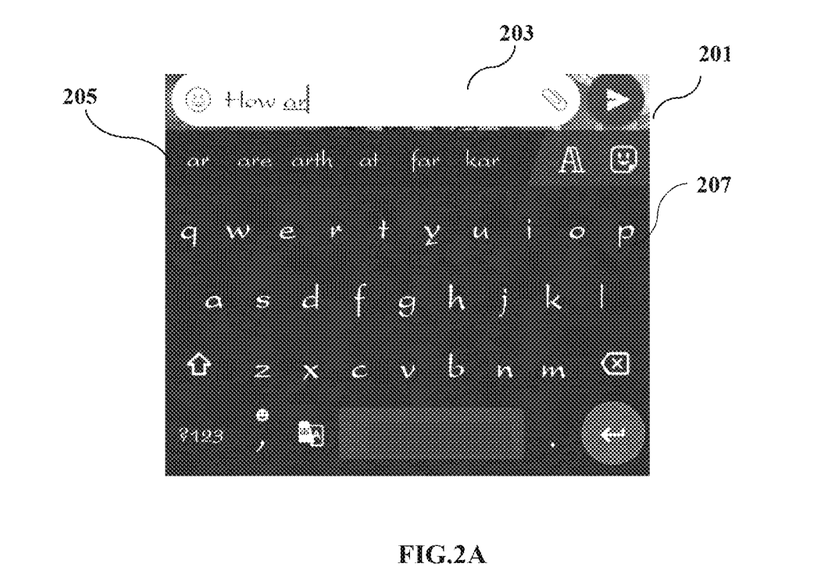
FIGS. 2A-2B illustrate a schematic representation/screen shot of the graphical user interfaces displayed on a display unit of an electronic device, showing a rendering of word suggestions on a quick access interface, according to one embodiment herein.
Figure 2B:
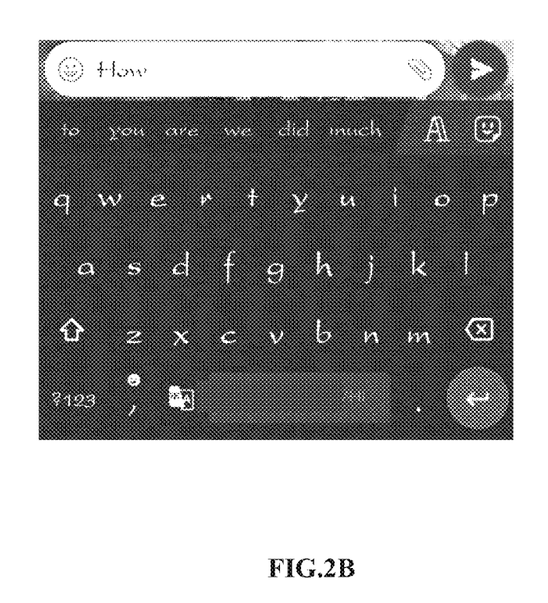

The AI engine renders 105 one or more words on a quick access interface based on the dynamically generated suggestions. In an embodiment, the one or more words comprise, for example, suggestions for word completion, prediction of next word(s) of a sentence. In an embodiment, the AI engine renders words related to the context and/or the intent of the input message, most used words, recently used words, and top used words in a dynamically configurable order on the quick access interface. Furthermore, in an embodiment, the AI engine renders the word suggestions as a user starts entering a message in the input field provided by the user application for the user. In an embodiment, the quick access interface is positioned proximal to the input field in a switchable location on an input interface, for example, a touch-enabled keyboard interface, of an electronic device as illustrated in FIGS. 2A-2B. The quick access interface displays predictions and suggestions of one or more words in a conveniently accessible and switchable location on the input interface. In an embodiment when the input message in not detected in the input field of the user application, the AI engine renders preconfigured grouped sets of words on the quick access interface.

FIGS. 2A-2B illustrate graphical user interfaces (GUIs) 201 displayed on a display unit of an electronic device, showing a rendering of word suggestions on a quick access interface 203, also referred to as an "suggestion bar", according to one embodiment herein. When a user invokes an input interface, for example, the keyboard interface 207, through a user application, the AI engine displays a predetermined word suggestion, for example, the most used words by default in the suggestion bar 203 positioned in a row of the keyboard interface 207. The illustrated graphical user interfaces (GUIs) 201 shows predicted words based on the context of the input message and completion of the words.

FIG. 3 illustrates an artificial intelligence-based language model, also referred as 'architecture' for dynamically generating one or more-word suggestions based on the context of the received message on a graphical user interface provided by a system, according to one embodiment herein. In an exemplary embodiment, the architecture includes an input layer 301, an embedding layer 303, Long Short-Term Memory (LSTM) layer 305, a first dense layer 307, an output activation layer such as LeakyReLU layer 309, a second dense layer 311, and an output 313. The AI engine processes the input message received from the user on the graphical user interface of the user application to transform the input message into an array of numbers corresponding to an artificial intelligence model. The array of numbers is fed to the language model or the architecture. In one example, after receiving the input message, the AI engine is configured to convert the input message to lowercase and remove unnecessary spaces and punctuation. The process of removal remove unnecessary spaces and punctuation may be referred as sanitization. After sanitization, the AI engine is configured to check the length of input message. In one embodiment, the length of the input message configured to be fed to the architecture is required to be of a specified number of characters. In one example, the number of characters or the length of the input message is 25. If the length of input message is less than the specified number, the AI engine appends the padding token and if the length of input is greater than the specified number, the AI engine truncates the starting characters from message to make the length equal to 25. In one embodiment, when length of input equal to the specified number, AI engine converts the message into an array of numbers using the vocabulary files of the AI model.

In an example, the vocabulary of the AI model is: {'<p>': 0, 'a': 1, 'b': 2, 'c': 3, 'd': 4, 'e': 5, 'f': 6, 'g': 7, 'h': 8, 'i': 9, 'j': 10, 'k': 11, 'l': 12, 'm': 13, 'n': 14, 'o': 15, 'p': 16, 'q': 17, 'r': 18, 's': 19, 't': 20, 'u': 21, 'v': 22, 'w': 23, 'x': 24, 'y': 25, 'z': 26, ' ': 27} Input message is "How are you". Text after converting to lowercase is "how are you". The length of text is less than 25, so the AI engine append the padding token ('<p>'), after appending padding token, the text is "how are you<p><p><p><p><p><p><p><p><p><p><p><p><p><p>" Now the AI engine looks for each token in vocabulary and replace each character with corresponding integer present in vocabulary. The array of numbers becomes: [8, 15, 23, 27, 1, 18, 5, 27, 25, 15, 21, 0, 0, 0, 0, 0, 0, 0, 0, 0, 0, 0, 0, 0, 0]. The resulted array of numbers is further fed to the AI model to fetch the output of suggested words.

The architecture receives the array of numbers, wherein the array of number is given to the input layer 301. The input layer 301 takes one dimensional array, such as (1, N), of integers as an input and passes the input to the embedding layer 303. In one example, the array of numbers of size (1, 25) with the help of vocabulary of the AI model. The embedded layer converts one dimensional array into 2-D matrix of embeddings. In one embodiment, the embeddings contain the semantic information of the tokens of the input message. The embedding may be any number of dimensions. In one example, the embedding is 16 dimensions for an array of number 25, that is the dimension of the matrix which is received from the embedding layer is (25, 16). Further, the matrix is passed to a normalization layer, which converts the matrix into normal distribution of an array to generate a feature map. The normalization layer does not change the shape of the feature map. In one embodiment, LSTM layer 305 is used to process the sequential information present in the feature map. In one embodiment, LSTM is a kind of Recurrent Neural Network that has a memory cell associated with it. LSTM layer 305 allows the training using longer sequences by reducing the chances of vanishing gradient problems. In an example, there are 512 units in the LSTM layer 305 and the one-dimensional array of shape (1, 512) is received as the output of LSTM layers 305.

The array is passed on the first dense layer 307 which is a Linear fully connected layer and passes the output to the next layer. In one embodiment, one dimensional array which received as output from LSTM layer 305 is passed to the first dense layer 307, which changes the dimension of the array. In one example, the dimension of the array is changed from (1, 512) to (1, 100). The array with changed dimension is passed through the activation layer such as LeakyReLU layer 309 which modifies the array but does not change the dimension of array. Further, the one-dimensional array of shape such as (1, 100) passes to the second dense layer 311. In one example, the second dense layer 311 uses activation function to convert the output array into probabilities. Based on used a vocabulary an array of probability of the same shape are received at the output 313. In one example, the input of the second dense layer 311 is one-dimensional array of 100 and the received output 313 is a set of probabilities based on the vocabulary of 17739 words. Hence, when the receive any input message, the AI engine converts the input message to one dimensional array of shape (1, N) after preprocessing and pass the array to the AI model. The AI model outputs an array of probabilities of shape (1, V) where V is the size of the vocabulary. The AI engine selects the top 'n' most probable words from this array of probabilities and show them on the suggestion bar of the user interface.

Figure 4:
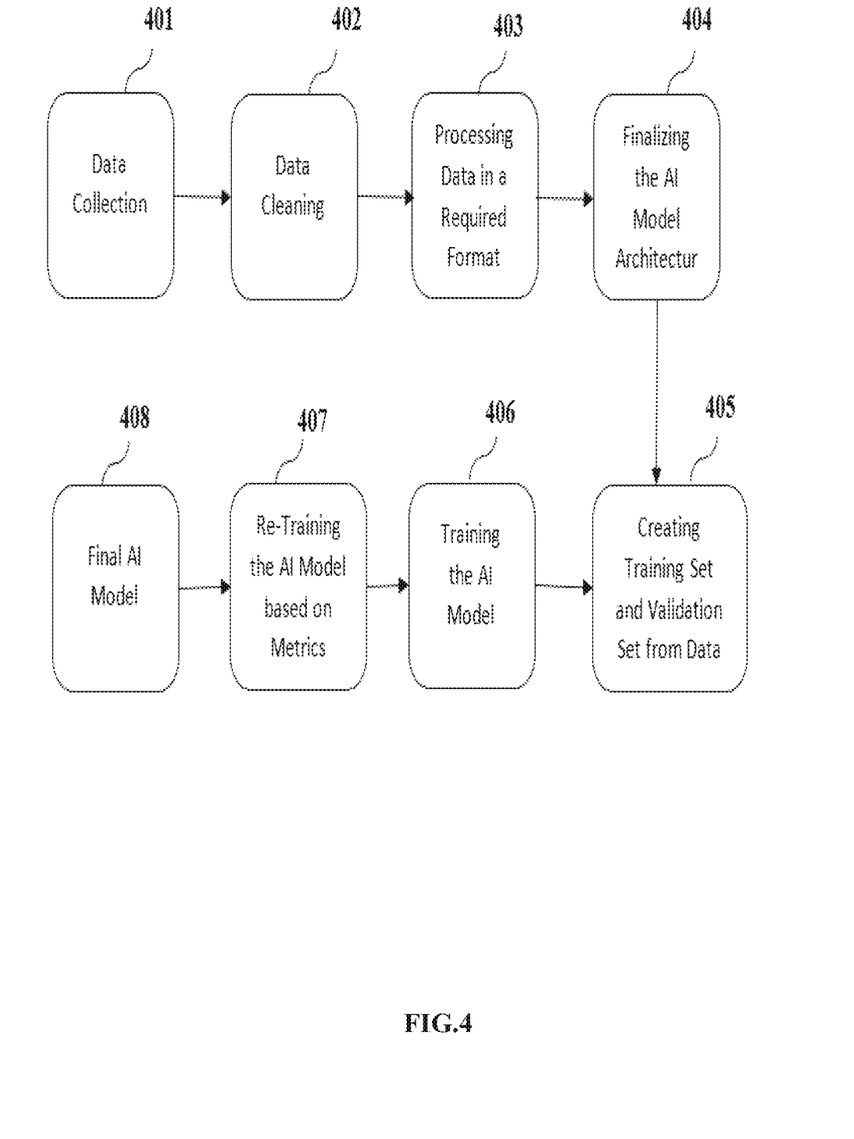
FIG. 4 illustrates a flowchart explaining a method of training the artificial intelligence-based language model, according to one embodiment herein.

FIG. 4 illustrates a flowchart method of training the artificial intelligence-based language model, according to one embodiment herein. The training of the AI model includes collection 401 of data. In one embodiment, the data is collected through Alt Control Delete (ACD) text. The ACD text also known as text message shorthand, used primarily in texting, online chat, instant messaging, email, blogs, and newsgroup postings. Further, the AI engine is configured to clean 402 the collected data. The cleaning of the data includes removal of unnecessary information such as emojis, symbols, numbers, and special characters. The AI engine further process 403 the cleaned data in a required format wherein the required format is to turn the data suitable for suggestion and prediction. In one embodiment, the cleaned data is transformed in such a way that the AI model can understand the suggestive and predictive approach with proximity typos. For example, to under suggestions in a sentence: 'How are you' and the transformation: 'how ar--->are, how are y--->you'. In another example, to understand prediction in a sentence: 'How are you' and the transformation: 'how<space>---->are, how are <space>--->you'. Further, the AI engine is configured to introduce typos into the data by adding one or two edit letters based on proximity keys in the keypad to words with length more than two letters. For example, to under typos in a sentence: 'How are you' and the transformation: 'how afe--->are, thimkinh-->thinking'.

Further, the AI engine configured to tune parameters of the AI model and finalize 404 the model architecture. In one embodiment, the parameters of the AI model include learning rate of the model, epochs, optimizers, number of units, batch size, and the like. Once the architecture is finalized, the AI engine is configured to create 405 at least one of training set, testing set, and the validation set from the data. The training set is used to train the AI model, testing set is used to test the various aspects of the AI model and the validation set is used validate the output of the model. The AI engine is further configured to train 406 the AI model and check the metrics on test dataset. The AI engine is configured to re-train 407 the AI model based on the metrics. In one embodiment, depending on the metrics, the AI model is tuning hyper-parameters to improve the metrics score and re-train the AI model based on the metrics. The final AI model will be ready 407 based on the re-training.

Figure 5A:
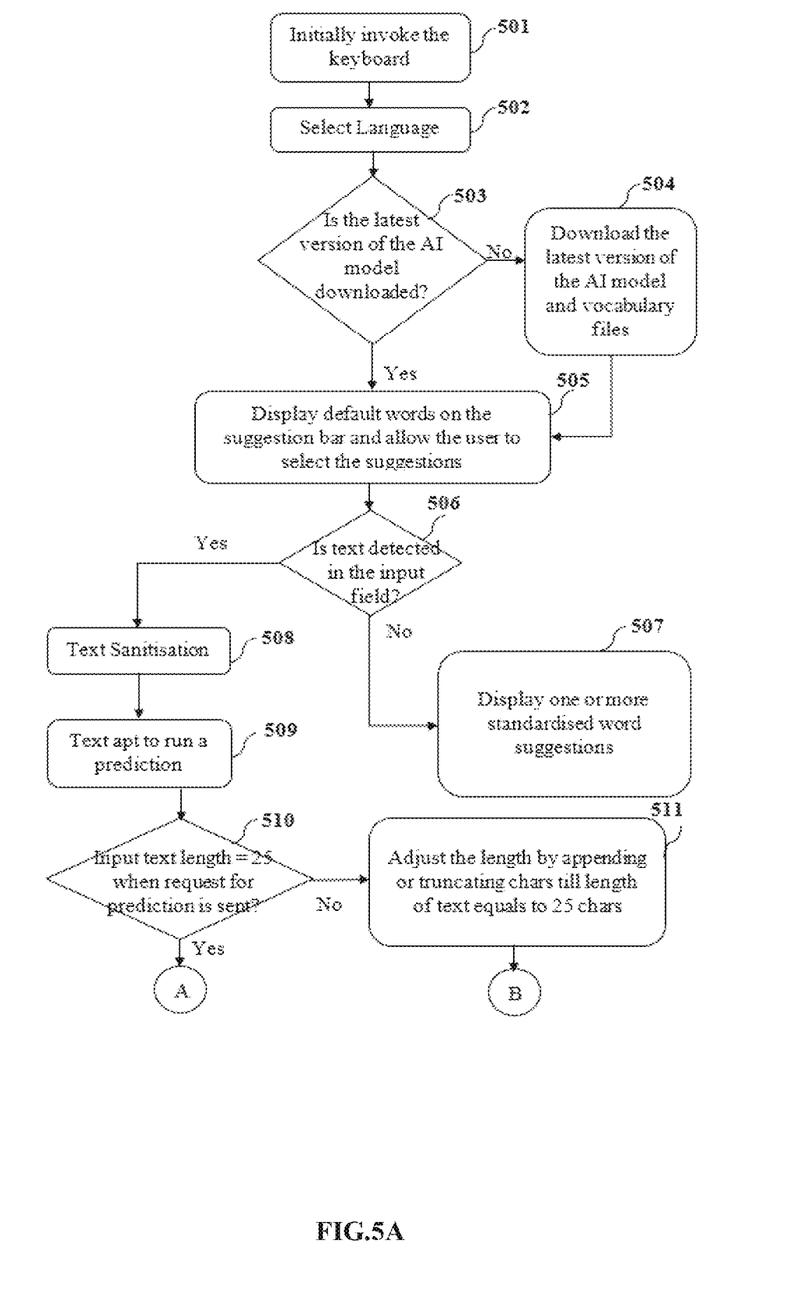
FIGS. 5A-5B illustrate a flowchart explaining an AI-based method for dynamically predicting and suggesting one or more words on a quick access interface based on one or more languages used in an input message, according to one embodiment herein.
Figure 5B:
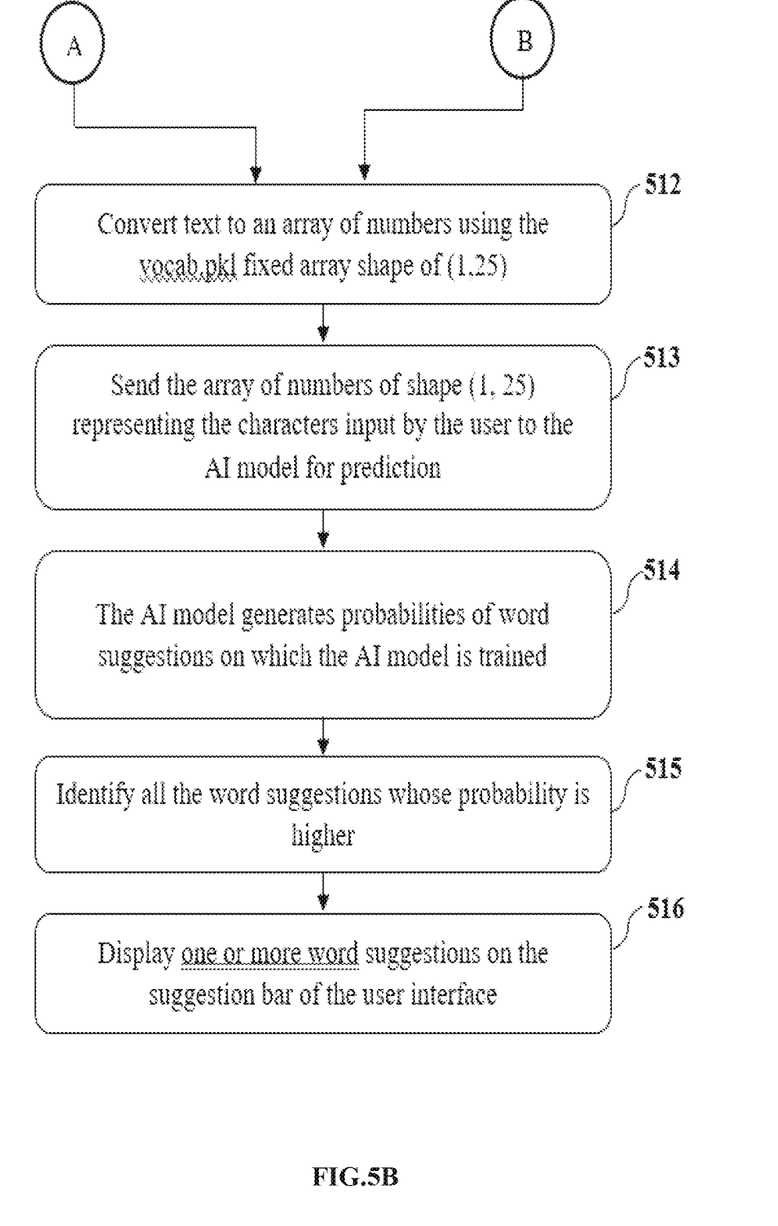

FIGS. 5A-5B illustrate a flowchart of an AI-based method for dynamically predicting and suggesting one or more words on a quick access interface based on one or more languages used in an input message, according to one embodiment herein. The process initiates 501 when a user invokes an input interface, for example, a touch-enabled keyboard interface, for entering a message into a user application, for example, a chat application or a messaging application deployed on an electronic device, for example, a smartphone. The keyboard interface is invoked with a default language, for example, English, and associated data and files required by the AI engine are downloaded from a server via a network. The AI engine allows the user to select 502 a language of their choice, for example, an Indian script (inscript) language or a macaronic language. The AI engine determines 503 whether a current version of the AI model for the selected language is downloaded to a data storage device of the electronic device. If the AI model for the selected language is not downloaded, then the AI engine downloads 504 the latest version of the AI model along with the vocabulary files from the server to the data storage device of the electronic device. The AI engine displays 505 default words on the suggestion bar and allow the user to select the suggestions. When a user starts typing text in an input field provided by the user application, the AI engine dynamically predicts the words based on the character mapping using the AI model trained as disclosed above.

The AI engine, in communication with a sensing unit of the electronic device, detects 506 whether text is entered in the input field. If there is no text in the input field, the AI engine renders 507 one or more standardised word suggestions. If the AI engine detects text in the input field, the AI engine executes the following AI algorithm defined by the trained AI model for dynamically predicting and suggesting one or more words on the suggestion bar. The AI engine sanitizes 508 the detected text, for example, by removing all special characters except a predefined number of punctuations, for example, [.,!"? and space] and by removing all characters outside a-z, A-Z, and 0-9. The AI engine then removes line breaks, variation selectors, and control characters. The AI engine then filters multiple allowed punctuations to a single occurrence. For example, the AI engine filters "!!!!" to "!". The AI engine then filters multiple character occurrences to two occurrences. The AI engine then identifies a repeating pattern and replaces the repeating pattern with a single pattern appearance. The AI engine also masks any numbers present in the text. Furthermore, the AI engine filters multiple spaces to a single space and strips leading and trailing spaces.

After the text is sanitized, the text is ready or apt 509 for further processing by the AI model. In an example, the AI engine determines 510 whether the input message length is less than 25 characters when a request for word prediction and suggestion is sent to the AI model. If the input message length is less than 25 characters when the request is sent to the AI model to word prediction and suggestion, the AI engine extrapolates 511 the input message length to make the input message length equal to 25 by appending or truncating the designated characters. When the input message length is equal to 25, then the AI engine receives up to 25 characters of the input message and converts 512 the 25 characters to an array of numbers using a vocabulary file, for example, vocab. pkl, that contains the character-number mapping. The AI engine converts the input message into an array of numbers of shape (1,25) representing characters input by the user and sent to the AI model for prediction. The AI engine sends 513 the array to the AI model for processing and word prediction. In an embodiment, using the AI model comprising batch normalization and dense layers, the AI engine predicts the probability of multiple words for the input sentence and generates 514 generates probabilities of word suggestions on which the AI model is trained. In an embodiment, the AI engine identifies 515 all the word suggestions whose probability is higher. For example, the model size is less than 10 MB and with the use of longer context it is possible to beat the conventional probabilistic algorithms in size, speed and accuracy completely. In one embodiment, the AI engine display 516 one or more word suggestions on the suggestion bar of the user interface.

Figure 6:
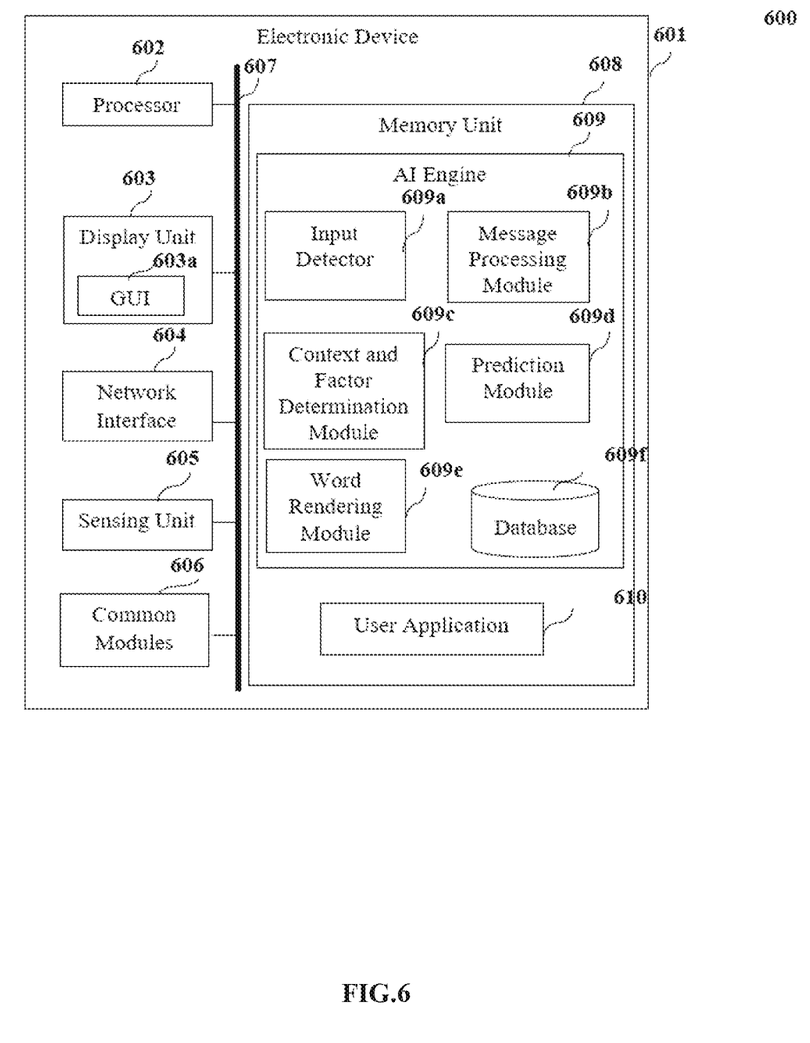
FIG. 6 illustrates an architectural block diagram of an electronic device/computing device or system comprising a direct message sending engine for directly sending messages with minimal user input, according to one embodiment herein.

FIG. 6 illustrates an architectural block diagram of an exemplary implementation of the AI-based system (alternatively referred to as a system) for dynamic word prediction and suggestion on a quick access interface in real time, according to one embodiment herein. Various aspects of the present invention may be embodied as a system, a method, or a non-transitory, computer-readable storage medium having one or more computer-readable program codes stored thereon. Accordingly, various embodiments of the present invention may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable storage media comprise hard drives, solid state drives, optical discs or magnetic disks, memory chips, a read-only memory (ROM), a register memory, a processor cache, a random-access memory (RAM), etc.

In an embodiment, the AI-based system disclosed herein comprises the AI engine 609 (alternatively referred to as an 'engine') implemented in an electronic device 601 as illustrated in FIG. 6. The electronic device 601 is a computing device, for example, one or more of a personal computer, a tablet computing device, a mobile computer, a smart phone, a portable computing device, a laptop, a wearable computing device such as smart glasses, a smart watch, etc., a touch centric device, a workstation, a client device, a portable electronic device, a network-enabled computing device, an interactive network-enabled communication device, a gaining device, an image capture device, a web browser, a portable media player, a video recorder, any other suitable computing equipment or combinations of multiple pieces of computing equipment.

According to one embodiment herein, the AI engine 609 is implemented using programmed and purposeful hardware of the electronic device 601. In an embodiment, the AI engine 609 is accessible to users, for example, through a broad spectrum of technologies and user devices such as smart phones, tablet computing devices, endpoint devices, etc., with access to a network, for example, a short-range network or a long-range network. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultrawideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the AI engine 609 deployed in the electronic device 601 communicates with a server via the network, for example, for downloading a current version of the AI model for dynamic word prediction and suggestion on a quick access interface in real time as disclosed in the detailed description of FIGS. 5A-5B. In an embodiment, the current version of the AI model files is stored in a local database 609f.

As illustrated in FIG. 6, the electronic device 601 comprises at least one processor 602 and a non-transitory, computer-readable storage medium, for example, a memory unit 608, for storing computer program instructions defined by the modules, for example, 609a, 609b, 609c, 609d, and 609e of the AI engine 609. The memory unit 608 is used for storing program instructions, applications, and data. The memory unit 608 is, for example, a random-access memory (RAM) or another type of dynamic storage device that stores information and instructions for execution by the processor 602. The memory unit 608 also stores temporary variables and other intermediate information used during execution of the instructions by the processor 602. The electronic device 601 further comprises read only memories (ROMs) or other types of static storage devices that store static information and instructions for execution by the processor 602. In an embodiment, the modules, for example, 609a, 609b, 609c, 609d, and 609e and the database 609f of the AI engine 609 are stored in the memory unit 608 as illustrated in FIG. 6.

The processor 602 is operably and communicatively coupled to the memory unit 608 for executing the computer program instructions defined by the modules, for example, 609a, 609b, 609c, 609d, and 609e of the AI engine 609. The processor 602 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 602 is implemented as a processor set comprising, for example, a programmed microprocessor and a math or graphics co-processor. The AI engine 609 is not limited to employing the processor 602. In an embodiment, the AI engine 609 employs one or more controllers or microcontrollers.

As illustrated in FIG. 6, the electronic device 601 further comprises a data bus 607, a display unit 603, a network interface 604, a sensing unit 605, and common modules 606. The data bus 607 permits communications between the modules, for example, 602, 603, 604, 605, 606, and 608. The display unit 603, via a graphical user interface (GUI) 603a, displays information, display interfaces, media content, user interface elements such as checkboxes, input message fields, etc., for example, for allowing a user to invoke and execute the AI engine 609, input message into an input field provided by a user application 610 (or messaging application), select a word suggestion from the suggestions rendered on the quick access interface, etc. The GUI 603a comprises, for example, online web interfaces, web-based downloadable application interfaces, mobile-based downloadable application interfaces, etc.

The network interface 604 enables connection of the AI engine 609 to the network. In an embodiment, the network interface 604 is provided as an interface card also referred to as a line card. The network interface 604 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The sensing unit 605 comprises one or more sensors operably coupled to the processor 602 of the electronic device 601. The sensors comprise, for example, tactile sensors, image sensors, motion sensors, gesture sensors, etc., and other sensors configured to receive inputs of different types from a user. The common modules 606 of the electronic device 601 comprise, for example, input/output (I/O) controllers, input devices, output devices, fixed media drives such as hard drives, removable media drives for receiving removable media, etc. Computer applications and programs are used for operating the AI engine 609. The programs are loaded onto fixed media drives and into the memory unit 608 via the removable media drives. In an embodiment, the computer applications and programs are loaded into the memory unit 608 directly via the network.

According to one embodiment herein, the AI engine 609 comprises multiple modules defining computer program instructions, which when executed by the processor 602, cause the processor 602 to dynamically predict and suggest one or more words based on the context of the input message on a quick access interface in real time. In an embodiment, the modules of the AI engine 609 comprise an input detector 609a, a message processing module 609b, a context and factor determination module 609c, a prediction module 609d, and a word rendering module 609e. The input detector 609a detects an input message in an input field provided on the GUI of the user application 610. The message processing module 609b processes the input message to identify multiple elements, for example, character elements, grammatical elements, numeric elements, image elements, line break elements, space elements, patterns, etc., of the input message. The context and factor determination module 609c analyses and determines a context and multiple factors associated with the input message for each of the identified elements of the input message using an AI model that is trained as disclosed above. The factors associated with the input message comprise, for example, a location of the input message, positions of the words in the input message, one or more languages including macaronic languages of the input message, intent of the input message, user preferences, global preferences, etc. The prediction module 609d, in communication with the context and factor determination module 609c, dynamically generates predictions of words based on the determined context and one or more of the factors in real time.

The word rendering module 609e renders one or more words on the quick access interface based on the dynamically generated predictions. The word rendering module 609e renders word suggestions related to the context and/or the intent of the input message based on word analysis and character analysis of the input message. Also, the word rendering module 609e renders word suggestions related to most used words, recently used words, common typos, and top used words in a dynamically configurable order on the quick access interface. Furthermore, the word rendering module 609e renders the word suggestions as a user starts entering a message in the input field provided by the user application 610 for convenient usage. In an embodiment when the input message in not detected in the input field of the user application 610, the word rendering module 609e renders preconfigured group words on the quick access interface.

The input detector 609a, the message processing module 609b, the context and factor determination module 609c, the prediction module 609d, and the word rendering module 609e are disclosed above as software executed by the processor 602. In an embodiment, the modules, for example, 609a, 609b, 609c, 609d, and 609e of the AI engine 609 are implemented completely in hardware. In one embodiment, the modules, for example, 609a, 609b, 609c, 609d, and 609e of the AI engine 609 are implemented by logic circuits to carry out their respective functions disclosed above. In one embodiment, the AI engine 609 is also implemented as a combination of hardware and software including one or more processors, for example, 602, that are used to implement the modules, for example, 609a, 609b, 609c, 609d, and 609e of the AI engine 609. The processor 602 retrieves instructions defined by the input detector 609a, the message processing module 609b, the context and factor determination module 609c, the prediction module 609d, and the word rendering module 609e from the memory unit 608 for performing respective functions disclosed above.

For purposes of illustration, the detailed description refers to the modules, for example, 609a, 609b, 609c, 609d, 609e, and 609f of the AI engine 609 being run locally on a single computer system; however the scope of the AI-based system and method disclosed herein is not limited to the modules, for example, 609a, 609b, 609c, 609d, 609e, and 609f of the AI engine 609 being run locally on a single computer system via the operating system and the processor 602, but may be extended to run remotely over the network by employing a web browser and a remote server, a mobile phone, or other electronic devices. In an embodiment, one or more portions of the AI-based system disclosed herein are distributed across one or more computer systems (not shown) coupled to the network.

The non-transitory, computer-readable storage medium disclosed herein stores computer program instructions executable by the processor 602 for dynamic word prediction and suggestion on a quick access interface in real time. The computer program instructions implement the processes of various embodiments disclosed above and perform additional steps that may be required and contemplated for dynamic word prediction and suggestion on a quick access interface in real time. When the computer program instructions are executed by the processor 602, the computer program instructions cause the processor 602 to perform the steps of the AI-based method for dynamic word prediction and suggestion on a quick access interface in real time as disclosed above. In an embodiment, a single piece of computer program code comprising computer program instructions performs one or more steps of the AI-based method disclosed above. The processor 602 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic. The computer program codes comprising computer readable and executable instructions can be implemented in any programming language. In an embodiment, the computer program codes, or software programs are stored on or in one or more mediums as object code.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. Where databases are described, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In one embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In one embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via the network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The disclosure describes a system and method for dynamic word prediction and suggestion on messages using artificial intelligence. The system uses an AI based algorithm in a fast Text module, wherein the fast Text module is used to find out similar words and to find contextually similar words. Fast Text module has been known for both word vector representation and text classification tasks. The system and method for dynamic word prediction and suggestion on messages will hugely help in reducing the latency and reduce size of the architecture. The system and method for dynamic word prediction and suggestion on messages help in identifying a spelling mistake and if a word is completely out of the final vocabulary of the model, having learnt the granular information and understanding the contextual information, the model will be able to predict a token/word/words for a given input sequence.

The system and the method for dynamic word prediction and suggestion on messages predicts words, offer suggestions while typing, autocorrecting, and word completion depending on the context formed. configured to generate text, text summarization and the like. Once the AI engine understands the nuances of a language, the AI engine may be further used in applications involving textual handling such as Intent Analysis, Sentiment Analysis, Chatbots, Generating Articles, Generating new sentences, paragraphs, or documents, Generating suggested continuation of a sentence, Transcribing a speech, Creating text captions for a movie or TV show, issuing commands to the radio while driving. Since the present invention includes benefits of both the Character based and Word-based models in one, the AI engine incorporates the character based morphological features of any language while maintaining the low computational cost and higher accuracy of Word-based model architectures. Accordingly, if a spelling mistake occurs or if a word is completely out of the final vocabulary of the AI model, the AI engine learns granular information and understands the contextual information to predict one or more word for a given input text.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

We claim:

1. An Artificial Intelligence (AI)-based hybrid system for dynamic word prediction and suggestion, the system comprising:
an electronic device comprising an input device, at least one processor, a memory unit operably and communicatively coupled to the at least one processor, and a display unit;
a sensor unit comprising a plurality of sensors and operably coupled to the at least one processor of the electronic device; and
an AI engine operably coupled to the sensor unit, the at least one processor, and a messaging application deployed on the electronic device, and wherein the AI engine is configured to:
identify a plurality of elements of an input message in an input language on the messaging application;
replace each of the plurality of elements of the input message with a corresponding integer present in a vocabulary of the input language and transform the input message into an array of specific numbers, based on the plurality of elements;
convert the array of specific numbers into a two-dimensional matrix of embeddings, wherein an embeddings include semantic information of the input message representing a context of the input message;
convert the two-dimensional matrix into a normal distribution array and generate a feature map, and process sequential information present within said feature map;
process said feature map to generate a one-dimensional array of a predetermined shape, and apply an activation function to said one-dimensional array to convert said one-dimensional array into an output array of probabilities based on said vocabulary, and wherein a shape of said output array of probabilities is based on a size of said vocabulary; and
select one or more words from said output array of probabilities as word suggestions corresponding to the input message.

2. The system as claimed in claim 1, wherein the plurality of elements include a character element, a grammatical element, a numeric element, an image element, a line break element, a space element, and a pattern.

3. The system as claimed in claim 1, wherein the AI engine is further configured to sanitize the input message prior to a transformation of the input message into the array of the specific numbers based on the plurality of elements, and wherein sanitization of the input message includes at least one of a conversion of the input message to lowercase characters and removal of spaces and punctuations, and removal of at least special characters, all characters other than a-z, A-Z, and 0-9, line breaks, variation selectors, control characters, repeated punctuations, and repeated characters.

4. The system as claimed in claim 1, wherein the AI engine is further configured to at least append or truncate characters of the input message to transform the input message into the array of specific numbers.

5. The system as claimed in claim 1, wherein the embeddings corresponding to the two-dimensional matrix represent number of dimensions of said two-dimensional matrix.

6. The system as claimed in claim 1, wherein the AI engine is further configured to generate said feature map based on the conversion of the two-dimensional matrix into the output array.

7. The system as claimed in claim 1, wherein the input language comprises at least one of individual languages and a mixture of two or more of the individual languages.

8. A hybrid method for dynamic word prediction and suggestion, the method comprising steps of:
- rendering, by an input device of an electronic device, a touch-enabled keyboard interface on a display unit of the electronic device;
- identifying, by an artificial intelligence (AI) engine, a plurality of elements of an input message in an input language on the messaging application;
- replacing each of the plurality of elements of the input message with a corresponding integer present in a vocabulary of the input language and transform the input message into an array of a specific numbers based on the plurality of elements;
- converting, by the AI engine, the array of specific numbers into a two-dimensional matrix of embeddings, wherein embeddings include semantic information of the input message representing a context of the input message;
- converting, by the AI engine, the two-dimensional matrix into a normal distribution array and generating, by the AI engine, a feature map;
- processing, by the AI engine, sequential information present within said feature map and generating, by the AI engine, a one-dimensional array of a predetermined shape;
- applying, by the AI engine, an activation function to said one-dimensional array and converting, by the AI engine, said one-dimensional array into an output array of probabilities based on said vocabulary, and wherein a shape of said output array of probabilities is based on a size of said vocabulary; and
- selecting, by the AI engine, one or more words from said output array of probabilities as word suggestions corresponding to the input message.

9. The method as claimed in claim 8, wherein the plurality of elements include a character element, a grammatical element, a numeric element, an image element, a line break element, a space element, and a pattern.

10. The method as claimed in claim 8, wherein the method further comprises sanitizing the input message prior to a transformation of the input message into the array of specific numbers based on the plurality of elements, and wherein sanitization of the input message includes at least one of a conversion of the input message to lowercase characters and removal of spaces and punctuations, and wherein the sanitization of the input message further includes removal of at least one of special characters, all characters other than a-z, A-Z, and 0-9, line breaks, variation selectors, control characters, repeated punctuations, and repeated characters.

11. The method as claimed in claim 8, wherein the method further comprises at least appending or truncating characters of the input message to transform the input message into the array of specific numbers.

12. The method as claimed in claim 8, wherein the embeddings corresponding to the two-dimensional matrix represent number of dimensions of the two-dimensional matrix.

13. The method as claimed in claim 8, further comprises generating said feature map based on the conversion of the two-dimensional matrix into the output array.

14. The method as claimed in claim 8, wherein the input language comprises at least one of individual languages and a mixture of two or more of the individual languages.

* * * * *